US010745832B2

(12) United States Patent
Hishida et al.

(10) Patent No.: US 10,745,832 B2
(45) Date of Patent: Aug. 18, 2020

(54) MATERIAL SHAPE SIMULATION APPARATUS, MATERIAL SHAPE SIMULATION METHOD, AND THREE-DIMENSIONAL WOVEN FIBER COMPONENT MANUFACTURING METHOD

(71) Applicants: IHI CORPORATION, Koto-ku (JP); The University of Tokyo, Bunkyo-ku (JP)

(72) Inventors: Hiroyuki Hishida, Koto-ku (JP); Koichi Inagaki, Koto-ku (JP); Takeshi Nakamura, Koto-ku (JP); Fumiaki Watanabe, Koto-ku (JP); Kotaro Morioka, Bunkyo-ku (JP); Yutaka Ohtake, Bunkyo-ku (JP); Hiromasa Suzuki, Bunkyo-ku (JP); Yukie Nagai, Bunkyo-ku (JP)

(73) Assignees: IHI CORPORATION, Koto-ku (JP); The University of Tokyo, Bunkyo-ku (JP)

( * ) Notice: Subject to any disclaimer, the term of this patent is extended or adjusted under 35 U.S.C. 154(b) by 6 days.

(21) Appl. No.: 16/116,086

(22) Filed: Aug. 29, 2018

(65) Prior Publication Data
US 2019/0040553 A1 Feb. 7, 2019

Related U.S. Application Data

(63) Continuation of application No. PCT/JP2017/004287, filed on Feb. 6, 2017.

(30) Foreign Application Priority Data

Feb. 29, 2016 (JP) .................................. 2016-037814

(51) Int. Cl.
*D03C 19/00* (2006.01)
*G06F 30/00* (2020.01)
(Continued)

(52) U.S. Cl.
CPC ........... *D03C 19/005* (2013.01); *D03D 11/00* (2013.01); *G05B 19/4099* (2013.01);
(Continued)

(58) Field of Classification Search
CPC .. D03C 19/005; D03D 11/00; G05B 19/4099; G05B 2219/35134; G05B 2219/49007;
(Continued)

(56) References Cited

U.S. PATENT DOCUMENTS

2014/0316547 A1   10/2014   Marchal et al.

FOREIGN PATENT DOCUMENTS

JP  8-338795     12/1996
JP  2004-9543 A   1/2004
(Continued)

OTHER PUBLICATIONS

Morioka et al., "Flattening simulations of 3D thick sheets made of fiber composite materials" available on line at www.sciencedirect.com. Available online Jan. 6, 2015 (Year: 2015).*
(Continued)

*Primary Examiner* — Thomas C Lee
*Assistant Examiner* — Michael Tang
(74) *Attorney, Agent, or Firm* — Oblon, McClelland, Maier & Neustadt, L.L.P.

(57) ABSTRACT

A material shape simulation apparatus for simulating deformation of a three-dimensional woven fiber material is provided and includes: an orientation vector field generation unit generating a model shape orientation vector field on three-dimensional meshes of a model shape of a three-dimensional woven fiber material obtained by stacking sheets of two-dimensional woven fabric made of X-yarn and Y-yarn and binding them with Z-yarn; a parameterization unit that searches for a gradient vector for calculating a material shape orientation vector field, being an orientation (Continued)

vector field of a material shape before deformation of the model shape, from the model shape orientation vector field; and an orientation vector updating unit that updates the model shape orientation vector field by applying a condition of preserving a volume between the model shape orientation vector field and the material shape orientation vector field and a condition that neither the X-yarn nor the Y-yarn expands or contracts.

10 Claims, 12 Drawing Sheets

(51) Int. Cl.
    *G06F 30/23*     (2020.01)
    *D03D 11/00*     (2006.01)
    *G05B 19/4099*     (2006.01)
    *G06F 113/24*     (2020.01)
    *G06F 113/26*     (2020.01)

(52) U.S. Cl.
    CPC .............. *G06F 30/00* (2020.01); *G06F 30/23* (2020.01); *D10B 2505/02* (2013.01); *G05B 2219/35134* (2013.01); *G05B 2219/49007* (2013.01); *G06F 2113/24* (2020.01); *G06F 2113/26* (2020.01); *Y02P 90/30* (2015.11)

(58) Field of Classification Search
    CPC .. G06F 17/50; G06F 17/5018; G06F 2217/42; G06F 2217/44; Y02P 90/30; D10B 2505/02
    See application file for complete search history.

(56) References Cited

FOREIGN PATENT DOCUMENTS

| | | |
|---|---|---|
| JP | 2004-292976 A | 10/2004 |
| JP | 2006-272928 | 10/2006 |
| JP | 2013-11504 | 1/2013 |
| JP | 2015-506007 A | 2/2015 |

OTHER PUBLICATIONS

Li et al, "All-hex meshing using singularity-restricted field", ACM Transactions on Graphics, vol. 31, No. 6, Article 177, Publication Date: Nov. 2012 (Year: 2012).*

International Search Report dated Apr. 25, 2017 in PCT/JP2017/004287, filed on Feb. 6, 2017 (with English Translation).

Written Opinion dated Apr. 25, 2017 in PCT/JP2017/004287, filed on Feb. 6, 2017.

Extended European Search Report dated Oct. 17, 2019 in European Patent Application No. 17759558.4, citing document AS therein, 10 pages.

Verpoest, I., et al., "Virtual textile composites software *WiseTex*: Integration with micro-mechanical, permeability and structural analysis", Composites Science and Technology, vol. 65, 2005, pp. 2563-2574.

Hertzmann, A., et al., "Illustrating smooth surfaces", in: Proceedings of the 27$^{th}$ Annual Conference on Computer Graphics and Interactive Techniques, 2002, 11 pages.

Hormann, K., et al., "MIPS: An Efficient Global Parametrization Method", in: P.P.L. Schumaker (Ed.), Composites Part A: Applied Science and Manufacturing: Saint-Malo 1999, Vanderbilt University Press, 2000, pp. 153-162.

Sander, P.V., et al., "Texture Mapping Progressive Meshes", in: Proceedings of ACM SIGGRAPH, ACM, 2001, 8 pages.

Desbrun, M., et al., "Intrinsic Parameterizations of surface Meshes", in: Computer Graphics Forum, Eurographics, vol. 21 No. 2, 2002, 10 pages.

Lévy, B., et al., "Least Squares Conformal Maps for Automatic Texture Atlas Generation", in: ACM SIGGRAPH conference proceedings, 2002, 10 pages.

Nieser, M., et al., "Cube Cover- Parameterization of 3D Volumes", in: Computer Graphics Forum, Eurographics Symposium on Geometry Processing , vol. 30 No. 5, 2011, 10 pages.

Nocedal, J., et al., "Numerical Optimization", Second Edition, Springer Series in Operations Research, Springer Science + Business Media, LLC, 2006, 683 pages.

* cited by examiner

FIG.17

| | Weighting Parameter | | | | Angular Difference (°) | | | |
|---|---|---|---|---|---|---|---|---|
| | $w_X$ | $w_Y$ | $w_Z$ | $W_{vol}$ | Average | Standard Deviation | Minimum Value | Maximum Value |
| 1 | 5.0 | 5.0 | 0.1 | 2.0 | 5.19 | 0.82 | 3.50 | 7.16 |
| 2 | 10.0 | 10.0 | 0.1 | 2.0 | 4.56 | 0.91 | 2.93 | 6.65 |
| 3 | 20.0 | 20.0 | 0.1 | 2.0 | 4.33 | 0.97 | 2.61 | 6.56 |
| 4 | 10.0 | 10.0 | 0.1 | 10.0 | 4.60 | 0.95 | 2.91 | 6.70 |
| 5 | 10.0 | 10.0 | 2.0 | 2.0 | 10.7 | 6.20 | 4.50 | 14.2 |

MATERIAL SHAPE SIMULATION APPARATUS, MATERIAL SHAPE SIMULATION METHOD, AND THREE-DIMENSIONAL WOVEN FIBER COMPONENT MANUFACTURING METHOD

TECHNICAL FIELD

The present disclosure relates to a material shape simulation apparatus, a material shape simulation method, and a three-dimensional woven fiber component manufacturing method and is suited for use in, for example, a three-dimensional woven fiber material.

BACKGROUND ART

In recent years, fiber-reinforced composite materials have come to be used in various fields. A fiber-reinforced composite material is a composite material manufactured by combining fibers with a support material; and since the fiber-reinforced composite materials have excellent material properties, that is, light weight and high strength as compared with single materials, the fiber-reinforced composite materials have been attracting attention as they can be used for components of, for example, aircrafts and vehicles. Examples of the fiber-reinforced composite materials include CMC (Ceramic Matrix Composites) and FRP (Fiber Reinforced Plastics) and different types of the fiber-reinforced composite materials are selected and used as appropriate depending on, for example, the environment to be used and the intended use.

Such fiber-reinforced composite materials have particularly high strength with respect to force in fiber directions, so that component shapes or the like are often formed by bending the fiber-reinforced composite materials without performing processing such as cutting in order to make use of the above-described properties. Therefore, a material shape of a flat plate for forming an intended three-dimensionally designed shape by means of bending is simulated and predicted by numerical calculation.

PTL 1 discloses a method for simulating the surface effect of woven fabric after being woven by using a weave diagram of woven fabric. PTL 2 discloses a plain-woven film material analysis system in which a weave shape of warp yarn and weft yarn is expressed as a waviness coefficient and deformation of this woven fabric is expressed as a continuous function with respect to a space. PTL 3 discloses a design method including: a step of acquiring shape data representing an outer surface of a component; a step of determining, with respect to each point of a set of points on the outer surface, the distance between the point and a projection of the point onto a target surface; and a step of determining the structure of a three-dimensional woven preform according to the determined distance.

CITATION LIST

Patent Literature

PTL 1: Japanese Patent Application Laid-Open (Kokai) Publication No. 2004-292976
PTL 2: Japanese Patent Application Laid-Open (Kokai) Publication No. 2004-009543
PTL 3: Japanese Patent Application Laid-Open (Kokai) Publication No. 2015-506007

Non-Patent Literature

NPL 1: A. Hertzmann, D. Zorin, Illustrating smooth surfaces, in: Proceedings of the 27th annual conference on Computer graphics and interactive techniques, 2002.
NPL 2: K. Hormann, G. Greiner, Mips: An efficient global parameterization method, in: P. P. L. Schumaker (Ed.), Composites Part A: Applied Science and Manufacturing: Saint-Malo 1999, Vanderbilt University Press, 2000.
NPL 3: P. V. Sander, J. Snyder, S. J. Gortler, H. Hoppe, Texture mapping progressive meshes, in: Proceedings of ACM SIGGRAPH, ACM, 2001.
NPL 4: M. Desbrun, M. Meyer, P. Alliez, Intrinsic parameterizations of surface meshes, in: Computer Graphics Forum, Vol. 21(3), 2002.
NPL 5: B. Levy, S. Petitjean, N. Ray, J. Maillot, Least squares conformal maps for automatic texture atlas generation, in: ACM SIGGRAPH conference proceedings, 2002.
NPL 6: M. Nieser, U. Reitebuch, K. Polthier, Cube cover—parameterization of 3d volumes, in: Computer Graphics Forum, Vol. 30, 2011.
NPL 7: Y. Li, Y. Liu, W. Xu, W. Wang, B. Cuo, All-hex meshing using singularity-restricted field, in: ACM Transactions on Graphics—Proceedings of ACM SIGGRAPH Asia 2012, Vol. 31(6), 2012.
NPL 8: J. Nocedal, S. J. Wright, Numerical Optimization, 2nd Edition, Springer Series in Operations Research, Springer Science+Business Media, LLC, 2006.

SUMMARY OF THE INVENTION

Problems to be Solved by the Invention

FIG. 18 a diagram illustrating an example of a fiber-reinforced composite material manufacturing process. Regarding the manufacturing process as illustrated in this drawing, a three-dimensional model shape and its fiber directions of, for example, a component are firstly determined (S61); and a material shape which is to be formed and bent into a model shape by means of, for example, simulation is calculated (S62). Next, the calculated material shape is applied to a fiber material (S63); and the fiber material is deformed by, for example, bending it and thereby formed into a product shape (S64). Lastly, the model shape and the product shape are compared and evaluated. The simulation as used in step S61 to calculate the material shape for forming the three-dimensional model shape is often designed to simulate each of two-dimensional woven fiber materials for a front surface and back surface of the model shape in two dimensions and predict a flat plate shape by making the simulated front and back surfaces correspond to each other.

However, the three-dimensional woven fiber material is formed by stacking up thin plates of plain-woven fibers made of X-yarn 11 and Y-yarn 12 and binding the plurality of thin plates with Z-yarn 13 as illustrated in FIG. 19, so that the three-dimensional woven fiber material shows different fiber directions and has an anisotropic structural property. FIG. 20 is a diagram showing a CT (Computed Tomography) image of a cross section of the three-dimensional woven fiber material which is deformed. The fiber material of this image is deformed along an arc around a center point 81. Sections indicated in white are sections where the X-yarn and the Y-yarn intersect with each other and it can be seen that those sections are moved towards the direction of the Z-yarn 13. If this material were isotropic, the Z-yarn 13 should have coincided with radial lines 82 extending from the center point 81. However, the Z-yarn 13 does not match deformation directions and is inclined. Accordingly, the X-yarn and the Y-yarn show different deformation properties from those of plain-woven fibers because of the Z-yarn. Therefore, it is difficult to accurately simulate the deformation of the three-dimensional woven fiber material by using the simulation of the two-dimensional woven fiber material.

The present disclosure was devised in consideration of the above-described circumstances and aims at providing an apparatus and method for more accurately simulating a material shape that simulates the deformation of the three-dimensional woven fiber material.

Means to Solve the Problems

In order to solve the above-described problem, a material shape simulation apparatus according to the present disclosure includes: an orientation vector field generation unit that generates a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding them with Z-yarn extending in a Z-direction; a parameterization unit that searches for a gradient vector for calculating a material shape orientation vector field, which is an orientation vector field of a material shape before deformation of the model shape, from the model shape orientation vector field; and an orientation vector updating unit that updates the model shape orientation vector field by applying a condition of preserving a volume between the model shape orientation vector field and the material shape orientation vector field and a condition that neither the X-yarn nor the Y-yarn expands or contracts.

Furthermore, a material shape simulation method according to the present disclosure includes: generating a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding them with Z-yarn extending in a Z-direction; searching for a gradient vector for calculating a material shape orientation vector field, which is an orientation vector field of a material shape before deformation of the model shape, from the model shape orientation vector field; and updating the model shape orientation vector field by applying a condition of preserving a volume between the model shape orientation vector field and the material shape orientation vector field and a condition that neither the X-yarn nor the Y-yarn expands or contracts.

Furthermore, a three-dimensional woven fiber component manufacturing method according to the present disclosure includes: calculating a material shape by the above-described material shape simulation method; creating a three-dimensional woven fiber material of the calculated material shape; and forming a three-dimensional woven fiber component by deforming the three-dimensional woven fiber material.

Advantageous Effects of the Invention

According to the present disclosure, the deformation of the three-dimensional woven fiber material can be simulated more accurately.

BRIEF DESCRIPTION OF DRAWINGS

FIG. 17 is a table indicating error differences caused by differences in weighting parameters for a deformation energy function;

DESCRIPTION OF EMBODIMENTS

Figure 1:
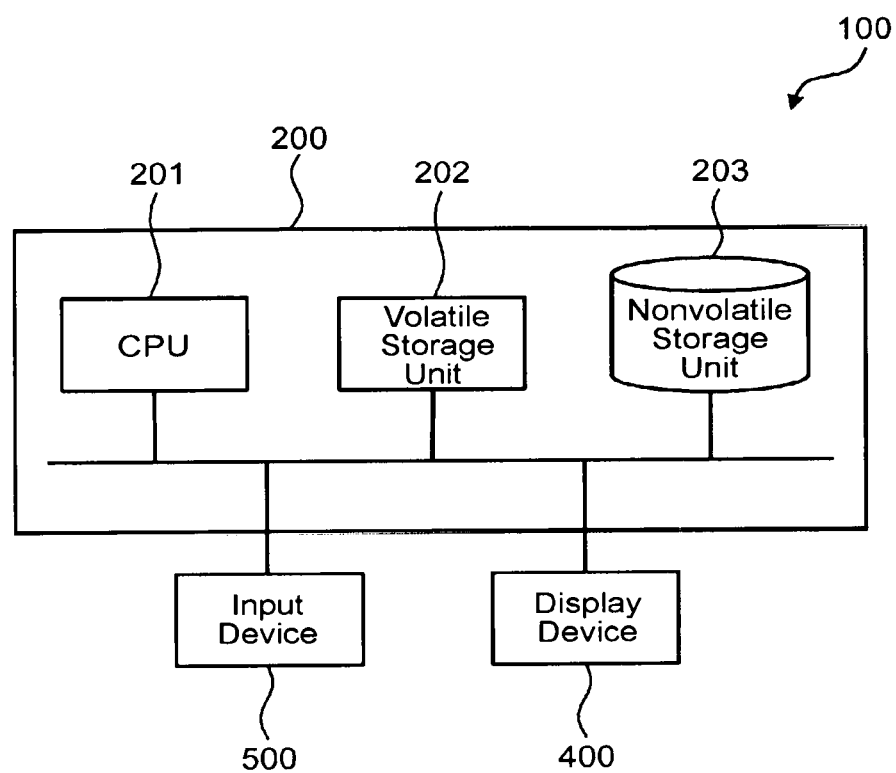
FIG. 1 is a diagram illustrating a hardware configuration of a material shape simulation apparatus according to an embodiment of the present disclosure.

An embodiment of the present disclosure will be explained below in detail with reference to the drawings. In the following explanation, the same reference numeral is assigned to similar elements and any duplicate explanation is omitted.

(1) Configuration of Material Shape Simulation Apparatus According to this Embodiment FIG. 1 is a diagram illustrating a hardware configuration of a material shape simulation apparatus 100 according to this embodiment. The material shape simulation apparatus 100 may be configured of a CPU (Central Processing Unit) 201, a volatile storage unit 202 such as a RAM (Random Access Memory), a nonvolatile storage unit 203 such as a hard disk and a flash memory, an input device 500 such as a keyboard and a mouse, and a display device 400 including, for example, a liquid display screen as illustrated in this drawing. Under this circumstance, the CPU 201, the volatile storage unit 202, and the nonvolatile storage unit 203 constitute a computation processing unit 200 that is operated by software. Incidentally, the material shape simulation apparatus 100 may be configured of a computer system to which a computer apparatus of the hardware configuration as illustrated in FIG. 1 is connected via a network.

Figure 2:
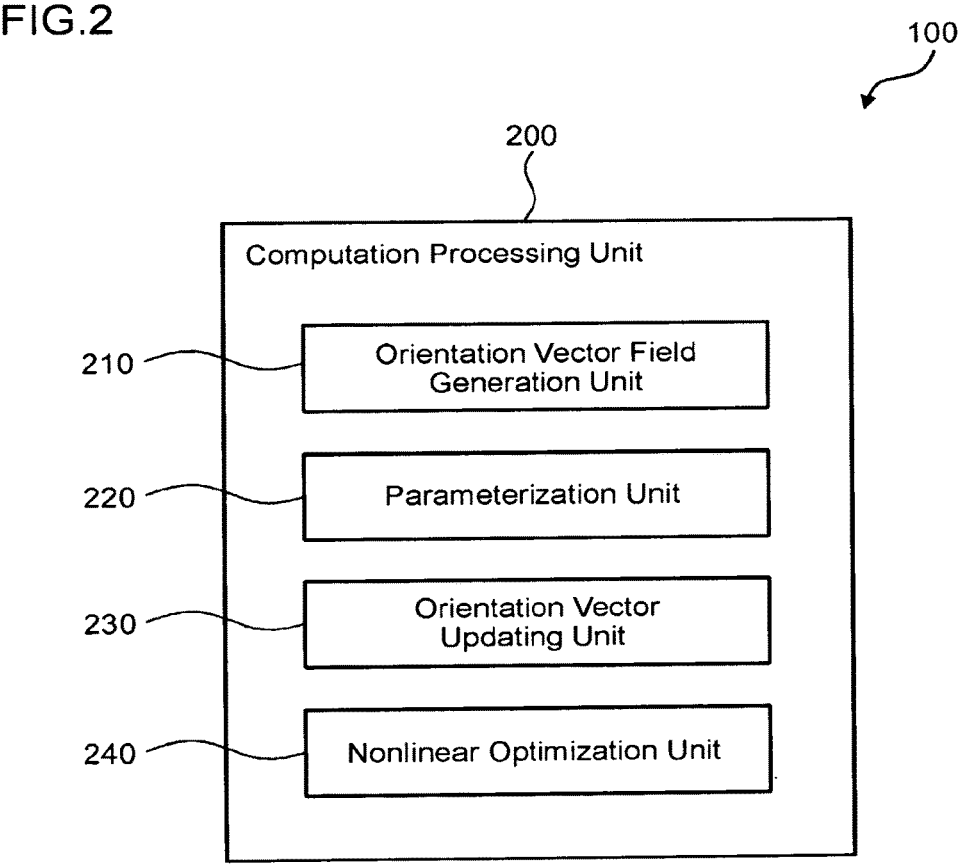
FIG. 2 is a block diagram illustrating a functional configuration of a computation processing unit for the material shape simulation apparatus.

FIG. 2 is a block diagram illustrating a functional configuration of the computation processing unit 200 for the material shape simulation apparatus 100. The computation processing unit 200 for the material shape simulation apparatus 100 as illustrated in this drawing includes: an orientation vector field generation unit 210 that generates a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding them with Z-yarn extending in a Z-direction; a parameterization unit 220 that searches for a gradient vector for calculating a material shape orientation vector field, which is an orientation vector field of a material shape before deformation of the model shape, from the model shape orientation vector field; an orientation vector updating unit 230 that updates the model shape orientation vector field by applying a condition of preserving a volume between the model shape orientation vector field and the material shape orientation vector field and a condition that neither the X-yarn nor the Y-yarn expands or contracts; and a nonlinear optimization unit 240 that further updates the model shape orientation vector field by minimizing strain energy of the model shape. Under this circumstance, the nonlinear optimization unit 240 is included in this embodiment; however, a configuration which does not include the nonlinear optimization unit 240 may also be employed.

Figure 3:
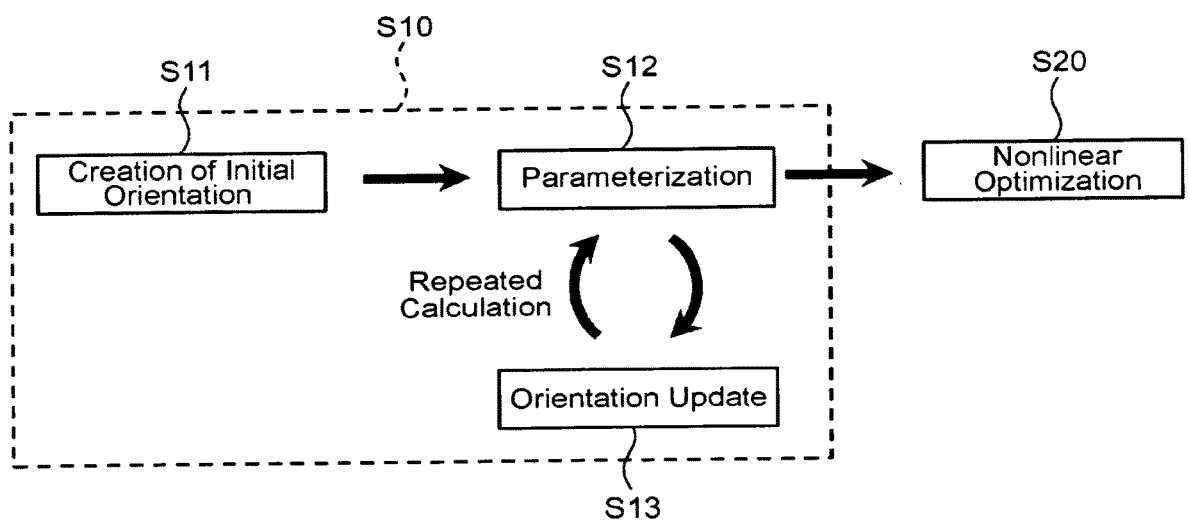
FIG. 3 is a flowchart illustrating the outline of simulation processing by the material shape simulation apparatus.

FIG. 3 is a flowchart illustrating the outline of simulation processing by the material shape simulation apparatus 100. Firstly, the orientation vector field generation unit 210 is caused to determine a fiber direction vector for a tetrahedron element, which is each mesh of the model shape, and creates an initial orientation vector (step S11) as illustrated in this drawing. Next, the parameterization unit 220 searches for a map f from the model shape to the material shape (step S12). When this happens, the map f may be searched for by performing parameterization such as the Taylor expansion. Subsequently, the orientation vector updating unit 230 is caused to update the material shape obtained by the parameterization to a model space by using specified conditions (step S13). Step S12 and step S13 are repeated. Lastly, the nonlinear optimization unit 240 is caused to perform optimization to minimize energy of fiber-bundle-direction strain and volumetric strain (step S20). When the nonlinear optimization unit 240 is not included, the processing is terminated as a result of repeating the parameterization processing and the orientation vector update processing. The processing of each processing block will be explained below in detail.

(2) Processing of Orientation Vector Field Generation Unit

Figure 4:
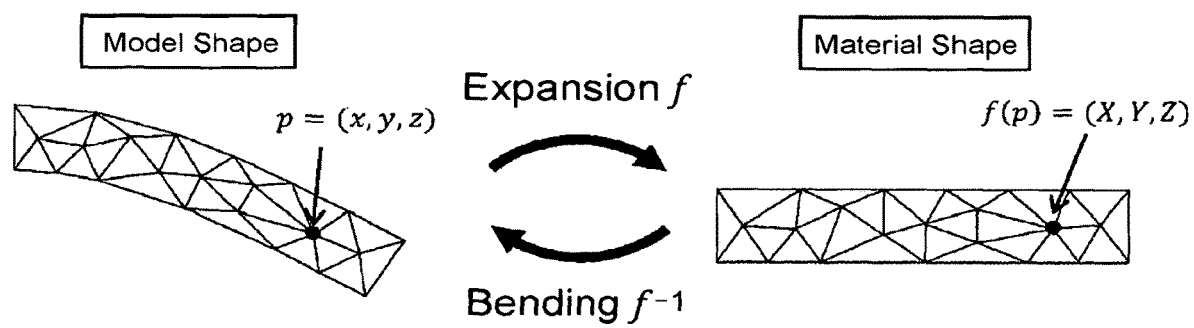
FIG. 4 is a diagram schematically illustrating the relationship between coordinates on a model shape and a material shape by the simulation processing.

FIG. 4 is a diagram schematically illustrating the relationship between coordinates on the model shape and the material shape by the simulation processing. When a mesh vertex $p_i$ of the model space (x, y, z) is mapped to a vertex $f(p_i)$ of the material space (X, Y, Z) by a mapping function f as illustrated in this drawing, an orientation vector is known as an ideal gradient vector of the mapping function f. When the mapping function f is expressed as Formula (1), gradient vectors of the mapping function f are expressed as Formula (2).

[Math. 1]

$$f(p_i) = (X(p_i), Y(p_i), Z(p_i)) \quad (1)$$

$$\nabla X = \begin{pmatrix} \frac{\partial X}{\partial x} \\ \frac{\partial X}{\partial y} \\ \frac{\partial X}{\partial z} \end{pmatrix}, \nabla Y = \begin{pmatrix} \frac{\partial Y}{\partial x} \\ \frac{\partial Y}{\partial y} \\ \frac{\partial Y}{\partial z} \end{pmatrix}, \nabla Z = \begin{pmatrix} \frac{\partial Z}{\partial x} \\ \frac{\partial Z}{\partial y} \\ \frac{\partial Z}{\partial z} \end{pmatrix}. \quad (2)$$

The ideal gradient vector is evaluated by each repetitive processing and the obtained ideal gradient vectors are called "orientation vectors." Each set of the three orientation vectors is assigned to a tetrahedron and an orientation vector field is used as a guidance field during the parameterization processing.

These orientation vectors are directly related to fiber directions through explicit deformation rules. In order to show this, Formula (3) is expressed as Jacobian matrixes of the mapping functions f and $f^{-1}$.

[Math. 2]

$$J_f = \begin{pmatrix} \frac{\partial X}{\partial x} & \frac{\partial X}{\partial y} & \frac{\partial X}{\partial z} \\ \frac{\partial Y}{\partial x} & \frac{\partial Y}{\partial y} & \frac{\partial Y}{\partial z} \\ \frac{\partial Z}{\partial x} & \frac{\partial Z}{\partial y} & \frac{\partial Z}{\partial z} \end{pmatrix}, J_{f^{-1}} = \begin{pmatrix} \frac{\partial x}{\partial X} & \frac{\partial x}{\partial Y} & \frac{\partial x}{\partial Z} \\ \frac{\partial y}{\partial X} & \frac{\partial y}{\partial Y} & \frac{\partial y}{\partial Z} \\ \frac{\partial z}{\partial X} & \frac{\partial z}{\partial Y} & \frac{\partial z}{\partial Z} \end{pmatrix}. \quad (3)$$

These Jacobian matrixes have the following obvious relationship as indicated as Formula (4) below.

[Math. 3]

$$J_f = (J_{f^{-1}})^{-1} \quad (4)$$

Since the three-dimensional woven fiber material is formed with fiber threads that intersect with each other at right angles, X-yarn, Y-yarn, and Z-yarn of a material space are oriented in parallel with basic directions of an XYZ space. Furthermore, in consideration of the fact that the fiber threads in the material space neither expand nor contract, the X-yarn, Y-yarn, and Z-yarn in this space are expressed, respectively, as Formula (5) below.

[Math. 4]

$$F_X = (1,0,0),$$

$$F_Y = (0,1,0),$$

$$F_Z = (0,0,1). \quad (5)$$

Fiber directions in a model space are set as $F^d_x$, $F^d_y$, $F^d_y$ and these are explicitly expressed as Formula (6) below by applying the Jacobian matrix $J_{f^{-1}}$ to $F_x$, $F_y$, $F_y$.

[Math. 5]

$$F_X^d = \begin{pmatrix} \frac{\partial x}{\partial X} \\ \frac{\partial y}{\partial X} \\ \frac{\partial z}{\partial X} \end{pmatrix}, F_Y^d = \begin{pmatrix} \frac{\partial x}{\partial Y} \\ \frac{\partial y}{\partial Y} \\ \frac{\partial z}{\partial Y} \end{pmatrix}, F_Z^d = \begin{pmatrix} \frac{\partial x}{\partial Z} \\ \frac{\partial y}{\partial Z} \\ \frac{\partial z}{\partial Z} \end{pmatrix}. \quad (6)$$

The following Formula (7) is derived by assigning Formulas (2) and (6) to Formula (3).

[Math. 6]

$$(F_X^d, F_Y^d, F_Z^d) = \begin{pmatrix} \nabla X^T \\ \nabla Y^T \\ \nabla Z^T \end{pmatrix}^{-1} \quad (7)$$

Formula (7) shows the relationship between the orientation vectors and the fiber directions in the model space. The set of these vectors can be deformed mutually by using Formula (7).

Processing by the orientation vector field generation unit 210 for forming a model shape orientation vector field in each mesh will be explained. The fiber direction vectors are assigned at a boundary of a curved surface of the model shape. These fiber direction vectors are defined by a tangent space of the curved surface and specified at a triangular surface area of a boundary surface. In order to generate an initial orientation vector field, the fiber direction vectors are calculated with respect to each tetrahedron of the model shape and are deformed to the model shape orientation vector field by using Formula (7). A fiber direction field is calculated based on specific fiber directions by employing the following steps 1 and 2.

Step 1: the fiber direction vectors of the curved surface at the boundary of the model shape are propagated.

Step 2: the fiber direction vectors are propagated towards inside the model shape.

Incidentally, methods other than those described above may be used to propagate the fiber direction vectors. the vectors are propagated by repeatedly calculating their average across adjacent triangles or tetrahedrons. Under this circumstance, Hertzmann's method of NPL 1 may be used.

Figure 5:
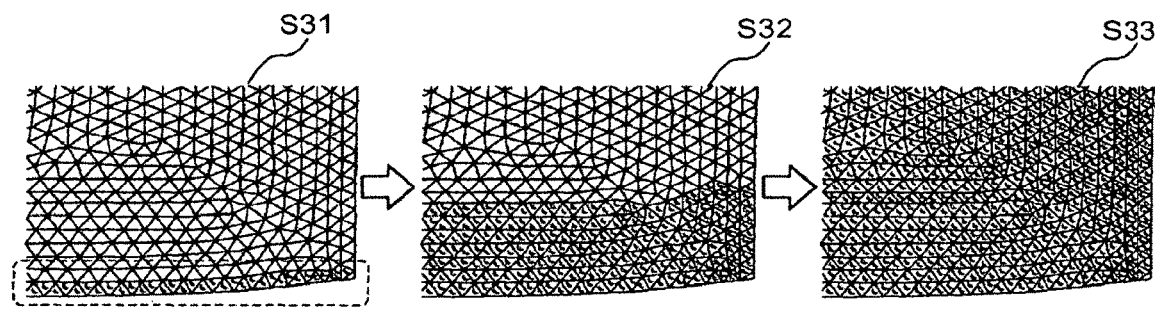
FIG. 5 is a diagram illustrating how fiber direction vectors propagate on a curved surface from an edge area where boundary conditions are set.

In step 1, it is necessary to perform global minimization of changes in the vectors of the adjacent triangles in order to obtain a smooth vector field; and this becomes a nonlinear problem. Under this circumstance, the nonlinear problem may be solved; however, this embodiment is designed to repeat local minimization by using an average value of angular differences of the vectors of the adjacent triangles. FIG. 5 illustrates how the fiber direction vectors propagate on the curved surface from an edge area where boundary conditions are set in step 1. Firstly, as illustrated in this drawing, the fiber direction vectors in a border area are set (step S31) and propagated (step S32), thereby generating the fiber direction vector field (step S33). In step 2, the smooth vector field can be obtained by using an average polar coordinate value of the adjacent tetrahedrons in the same manner. The fiber direction vectors can be located in each mesh by the above-described method. Formula (7) is applied to the obtained fiber direction vectors, thereby deforming them to model shape orientation vectors.

(3) Processing of Parameterization Unit

Regarding the parameterization, methods for making a three-dimensional curved surface corresponds to a two-dimensional Euclidean space are described in NPL 2 to NPL 5. In this embodiment, a method similar to NPL 6 and NPL 7 is employed to use a guidance vector field in which a 3-manifold is made to correspond to a three-dimensional Euclidean space.

A set of orientation vectors at an edge are defined by the following Formula (8) and coordinates ($p_i$, $p_j$) of a mapped vertex are expressed by the following Formula (9).

[Math. 7]

$$E_{ij} = (p_i, p_j),$$

as $(\nabla X)_{E_{ij}}, (\nabla Y)_{E_{ij}},$ and $(\nabla Z)_{E_{ij}}$ \quad (8)

$$f(p_i) = (X(p_i), Y(p_i), Z(p_i)),$$

$$f(p_j) = (X(p_j), Y(p_j), Z(p_j)) \quad (9)$$

Mapping conditions are expressed by the following Formula (10).

[Math. 8]

$$X(p_i) - X(p_j) = (\nabla X)_{E_{ij}} \cdot (p_i - p_j)$$

$$Y(p_i) - Y(p_j) = (\nabla Y)_{E_{ij}} \cdot (p_i - p_j)$$

$$Z(p_i) - Z(p_j) = (\nabla Z)_{E_{ij}} \cdot (p_i - p_j). \quad (10)$$

When Formula (10) is satisfied, the gradient vectors coincide with specific orientation vectors. Under this circumstance, the following Formula (11) which is a minimization function is created to sum up square errors of Formula (10) with respect to all edges.

[Math. 9]

$$F_X = \sum_{E_{ij}} \{X(p_i) - X(p_j) - (\nabla X)_{E_{ij}} \cdot (p_i - p_j)\}^2 \quad (11)$$

$$F_Y = \sum_{E_{ij}} \{Y(p_i) - Y(p_j) - (\nabla Y)_{E_{ij}} \cdot (p_i - p_j)\}^2$$

$$F_Z = \sum_{E_{ij}} \{Z(p_i) - Z(p_j) - (\nabla Z)_{E_{ij}} \cdot (p_i - p_j)\}^2,$$

$(\nabla X)_{E_{ij}}, (\nabla Y)_{E_{ij}}, (\nabla Z)_{E_{ij}}$ may be calculated by obtaining an average of the orientation vectors $(\nabla X)_{Tk}, (\nabla Y)_{Tk}, (\nabla Z)_{Tk}$ with respect to all tetrahedrons Tk. Each equation of this Formula (11) is minimized. When this happens, minimization of this formula is a linear problem and a conjugate gradient method may be applied. As a result, the gradient vectors for mapping from the model shape to the material shape can be found.

Figure 6:
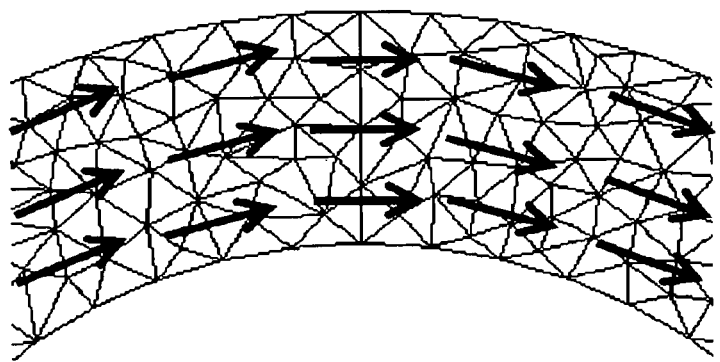
FIG. 6 is a diagram illustrating an example of distribution of an orientation vector field.
Figure 7:
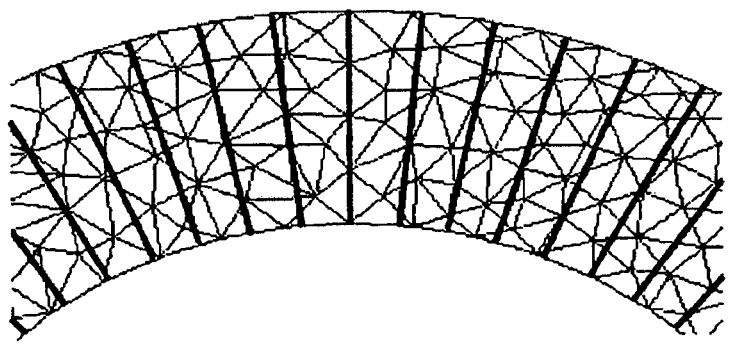
FIG. 7 is a diagram illustrating an example of parameterization in the distribution in FIG. 6.
Figure 8:
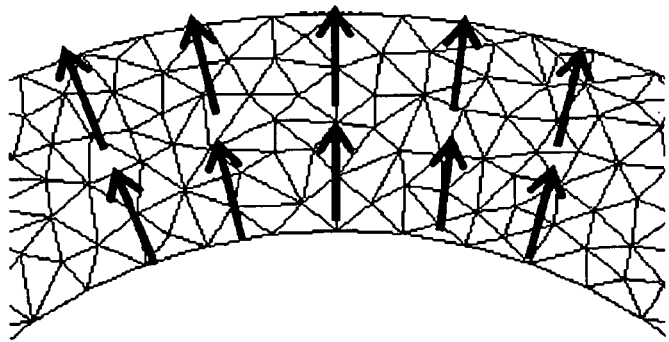
FIG. 8 is a diagram illustrating an example of distribution of an orientation vector field.
Figure 9:
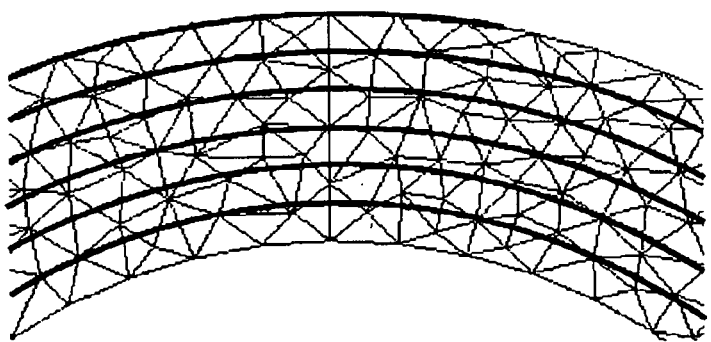
FIG. 9 is a diagram illustrating an example of parameterization in the distribution in FIG. 8.
Figure 10:
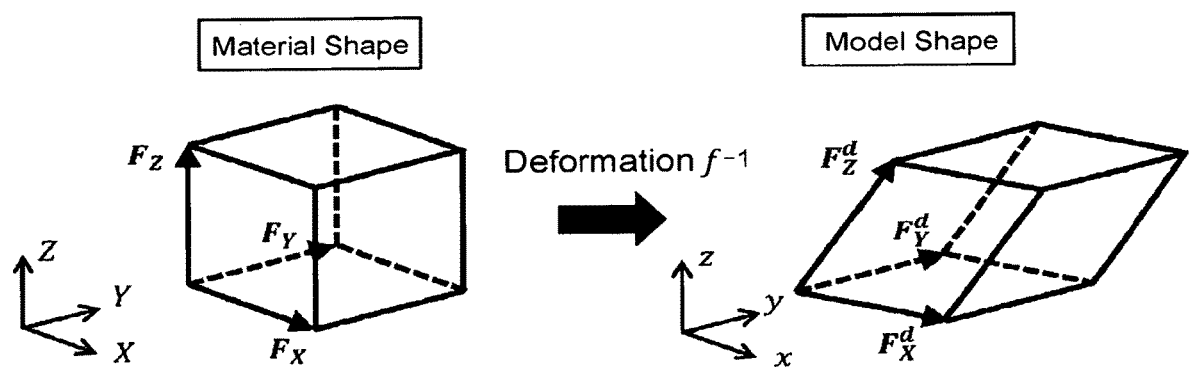
FIG. 10 is a diagram for explaining orientation vector update processing.
Figure 19:
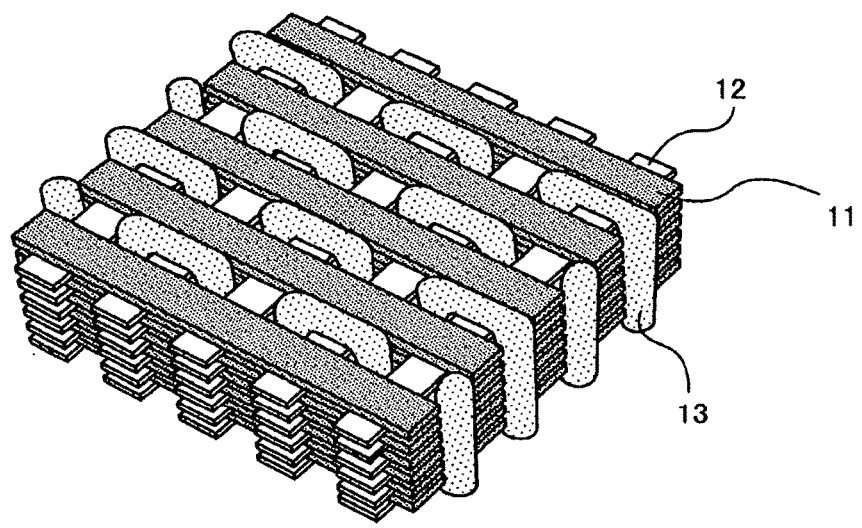
FIG. 19 is a diagram schematically illustrating a woven structure of a three-dimensional woven fiber material.
Figure 20:
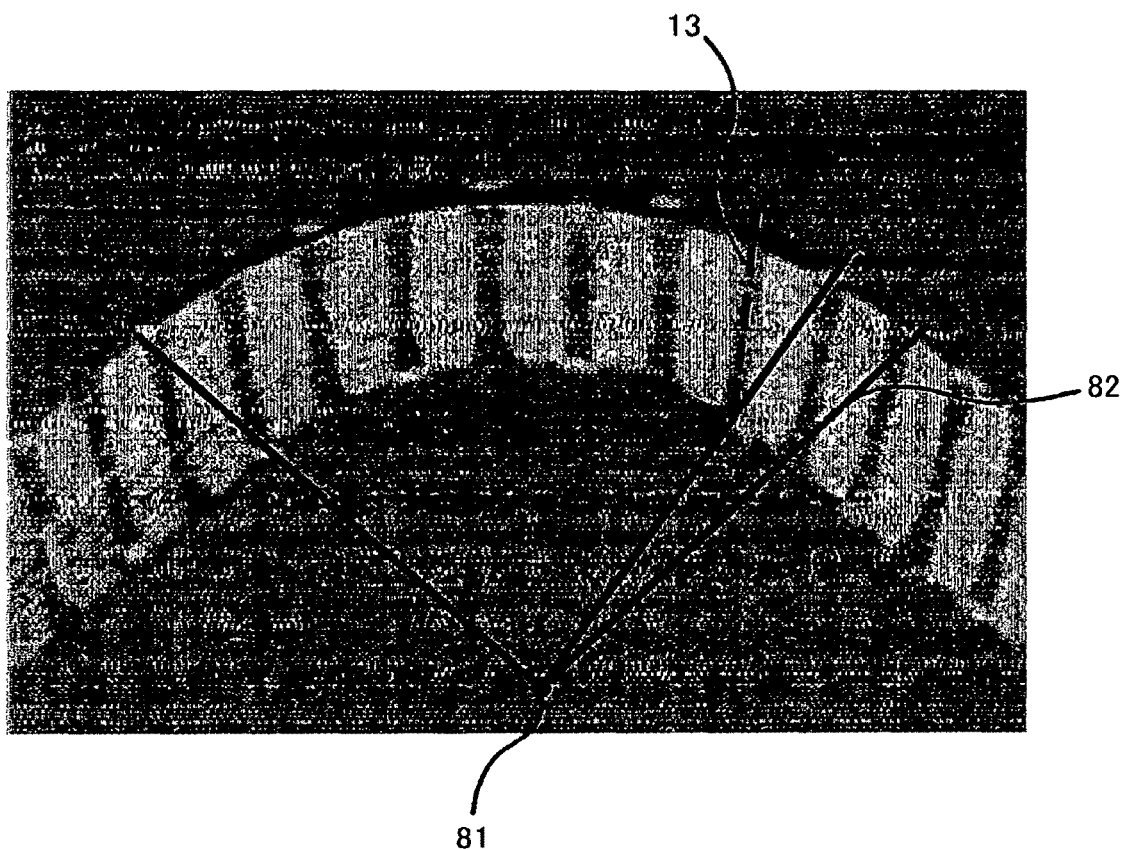
FIG. 20 is a diagram illustrating an example of a cross section of the three-dimensional woven fiber material which is deformed.

FIG. 6 to FIG. 9 are diagrams illustrating examples of two-dimensional parameterization using the model shape orientation vector field. FIG. 6 and FIG. 8 represent distribution of the model shape orientation vector field; and FIG. 7 and FIG. 9 are diagram showing the results of parameterization corresponding to FIGS. 6 and 8, respectively, as indicated with isoplethic lines. Regarding these results, Formula (10) is necessarily satisfied and the fiber direction vectors calculated from the gradient vectors of the mapping are different from desired results and deformation energy values become high. The processing of the orientation vector updating unit in the next section is to improve the orientation vector field on the basis of the results of this parameterization.

(4) Processing of Orientation Vector Updating Unit The processing of the orientation vector updating unit 230 is to update the orientation vector field based on a gradient filed. FIG. 10 is a diagram for explaining the orientation vector update processing. Deformation of a hexahedron with their sides formed of the fiber directions is expressed as illustrated in this drawing and a continuum deformation amount is used to explain local deformation. Referring to FIG. 19, inclination and expansion of the Z-yarn occur more easily than slippage movements of the X-yarn and the Y-yarn relative to each other at intersections between the X-yarn and the Y-yarn. Specifically speaking, shearing strain between the X/Y-yarn and the Z-yarn and strain of the Z-yarn occur more easily than strain between the X-yarn and the Y-yarn. Therefore, it can be assumed that the strain between the X-yarn and the Y-yarn does not occur and only the shearing strain between the X/Y-yarn and the Z-yarn occurs. Since a norm of the XY fiber direction deformation of the model space is close to a norm of the XY fiber direction deformation of the material space and the expansion/contraction of the Z-yarn can be considered to be caused as a result of forced volume changes, consideration should be paid to preserve the volume. Therefore, the following Formula (12) is applied.

[Math. 10]

$$\|F_X^d\|=1, \|F_Y^d\|=1, F_X^d \cdot (F_Y^d \times F_Z^d)=1 \quad (12)$$

Under this circumstance, when Formulas (5) and (7) are applied to Formula (12), conditions of the following Formula (13) can be obtained.

[Math. 11]

$$\frac{\|\nabla Y \times \nabla Z\|}{|\nabla X \cdot (\nabla Y \times \nabla Z)|} = 1,$$

$$\frac{\|\nabla Z \times \nabla X\|}{|\nabla X \cdot (\nabla Y \times \nabla Z)|} = 1, \quad (13)$$

$$\nabla X \cdot (\nabla Y \times \nabla Z) = 1.$$

The gradient vectors $(\nabla X)_f$, $(\nabla Y)_f$, and $(\nabla Z)_f$ obtained by the processing of the parameterization unit are used in order to obtain Formula (13) for updating the orientation vectors. Particularly, directions of the gradient vectors $(\nabla X)_f$, $(\nabla Y)_f$, and $(\nabla Z)_f$ are adopted as directions of the orientation vectors $\nabla X$, $\nabla Y$, and $\nabla Z$ and Formula (13) is used to determine the norm of the gradient vectors. Since the gradient of the mapping can be deformed in the fiber directions by using Formula (7), the norm of the vectors can be adjusted by using the fiber directions obtained by the parameterization so that the adjustment will be reflected in the actual deformation phenomenon of the fiber material. In this embodiment, the above-mentioned Formula (12) or (13) is applied; however, without limitation to these formulas, it is possible to apply a formula meaning the assumption that the strain between the X-yarn and the Y-yarn does not occur and only the shearing strain between the X/Y-yarn and the Z-yarn occurs.

Figure 11:
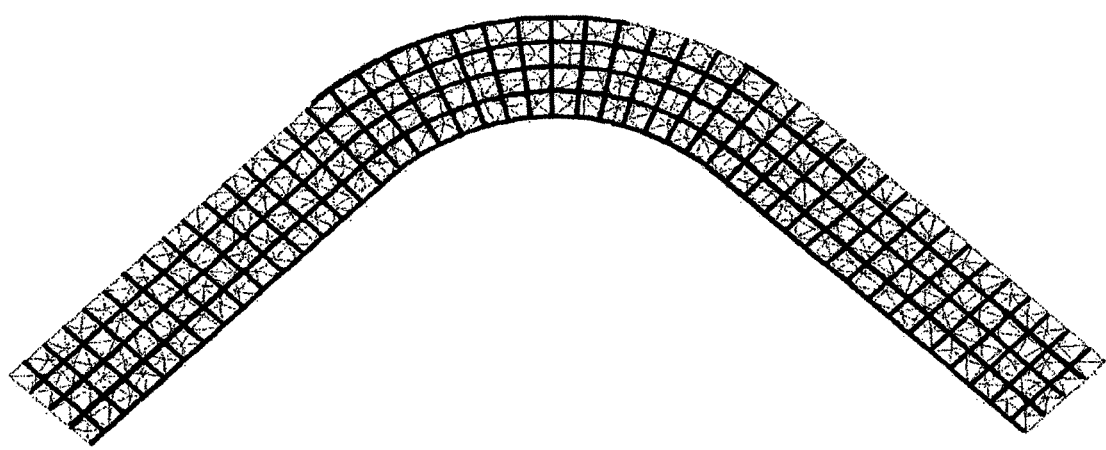
FIG. 11 is a diagram illustrating the result of first repetitive processing of parameterization processing and orientation vector update processing in a case of two dimensions.
Figure 12:
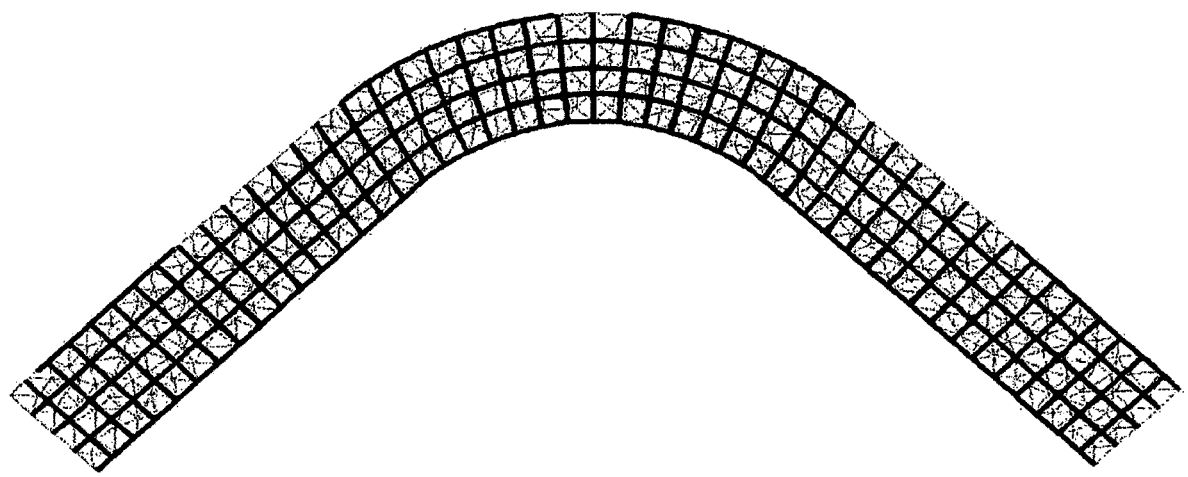
FIG. 12 is a diagram illustrating the result of 7th repetitive processing of the parameterization processing and the orientation vector update processing in the case of the two dimensions.
Figure 13:
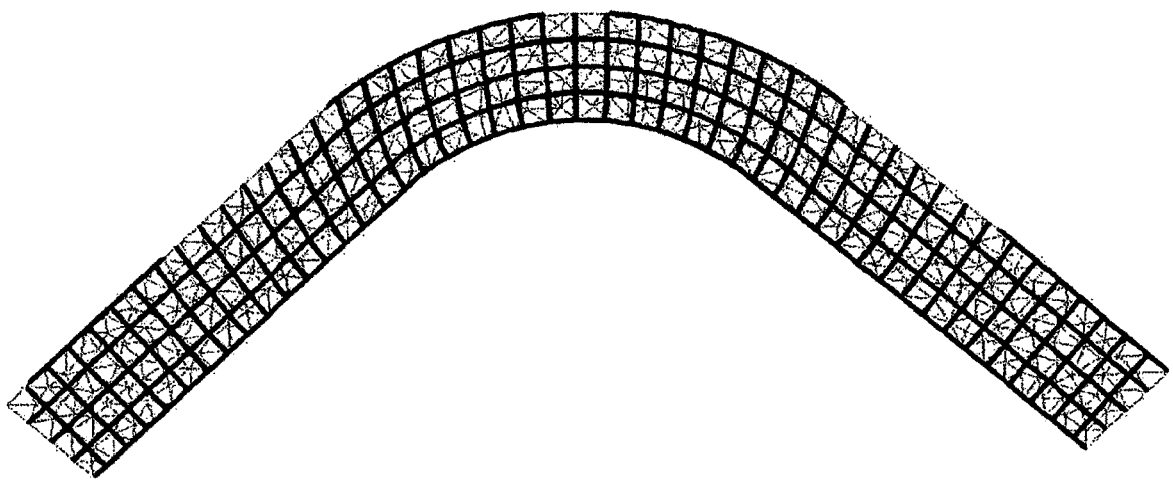
FIG. 13 is a diagram illustrating the result of 20th repetitive processing of the parameterization processing and the orientation vector update processing in the case of the two dimensions.
Figure 14:
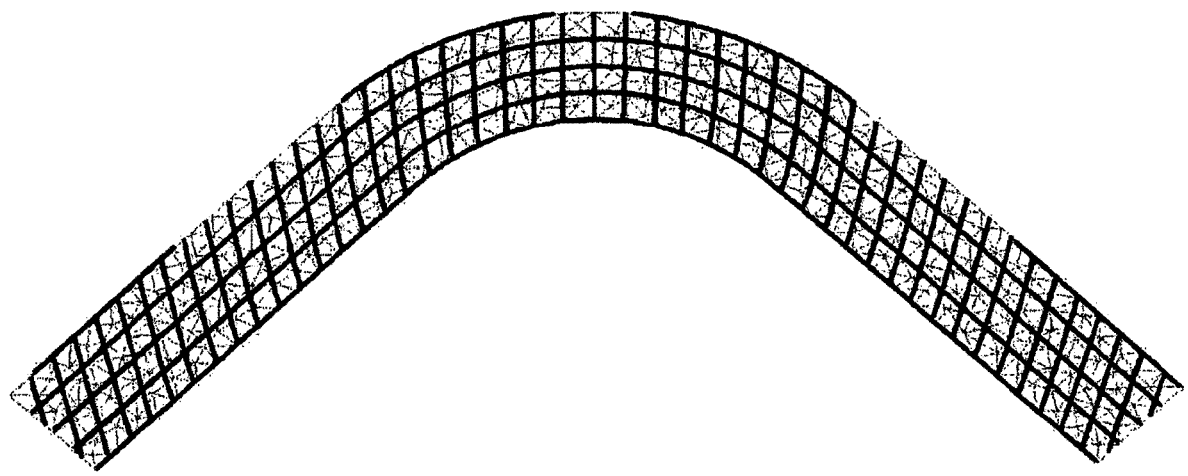
FIG. 14 is a diagram illustrating the result of 87th repetitive processing of the parameterization processing and the orientation vector update processing in the case of the two dimensions.

FIG. 11 to FIG. 14 are diagrams showing application results of the processing for repeating the parameterization processing and the orientation vector update processing in a case of two dimensions. FIG. 11 is the result of first repetitive processing; FIG. 12 is the result of 7th repetitive processing; FIG. 13 is the result of 20th repetitive processing; and FIG. 14 is the result of 87th repetitive processing. Solid lines represent coordinate lines mapped to the material space and correspond to the fiber directions in the model space. Regarding the result of the first repetitive processing illustrated in FIG. 11, the X-yarn expands considerably and the shearing strain rarely occurs. Accordingly, the first repetition result as illustrated in FIG. 11 is different from the actual deformation phenomenon. As the repetitive processing proceeds, the extraction of the X-yarn decreases and the shearing strain between the X-yarn and the Y-yarn increases as illustrated in the repetition results of FIG. 12 to FIG. 14. Therefore, the orientation of each yarn, particularly the Z-yarn, for the model shape and the material shape can be simulated accurately by assuming that the strain between the X-yarn and the Y-yarn does not occur and only the shearing strain between the X/Y-yarn and the Z-yarn occurs.

(5) Processing of Nonlinear Optimization Unit

The above-described repetition of the parameterization processing and the processing for updating the orientation vectors can indirectly minimize an energy function and roughly estimate the correspondence between the model shape and the material shape. The processing of this nonlinear optimization unit 240 can be used to accurately estimate the material shape and is the processing for directly minimizing a deformation energy function. The deformation energy function in consideration of a deformation mode of the three-dimensional woven fiber material can be expressed by the following Formula (14).

[Math. 12]

$$E \equiv w_X E_X + w_Y E_Y + w_Z E_Z + w_{vol} E_{vol}. \quad (14)$$

Regarding this formula, $E_X$, $E_Y$, and $E_Z$ are strain energy of X, Y, and Z, respectively and Evol is volume strain energy. Under this circumstance, a continuum can be assumed for calculation of each energy and the Young's modulus can be used for the calculation. Each of $w_X$, $w_Y$, $w_Z$, and $w_{vol}$ is a weighting parameter and can be determined based on experimental deformation results of the three-dimensional woven fiber material. This formula may be used to evaluate the deformation energy and be used as a condition to terminate the repetition of the parameterization processing and the orientation vector update processing. However, other termination conditions such as a specified number of times or any changes occurred in the results may be used and the deformation energy function may not be used. Since the strain energy of the model shape can be mitigated by executing the nonlinear optimization processing, the orientation of each yarn, particularly the Z-yarn, of the model shape can be simulated more accurately.

In order to minimize this nonlinear function, it is possible to use, for example, a linear search method according to Formula (15) below which expresses k-th repetition in a case where an initial solution is $x_0$.

[Math. 13]

$$x_{k+1} = x_k + \alpha_k p_k \quad (15)$$

Regarding the above formula, $p_k$ and $\alpha_k$ are a search direction and step size for the k-the repetition. Under this circumstance, a gradient direction of the deformation energy E can be used to determine the search direction P. Furthermore, NPL 8 can be used to find the step size $\alpha_k$.

Figure 15:
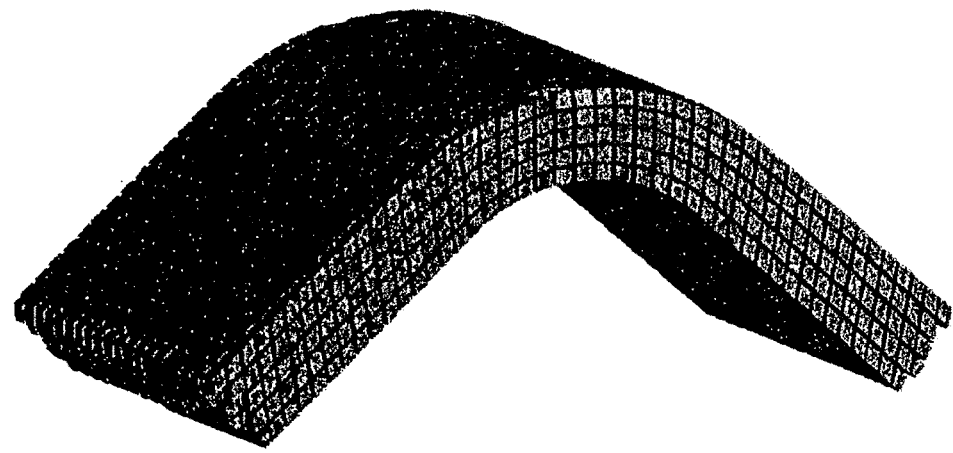
FIG. 15 is a diagram illustrating the result of simulating a model shape regarding an example of a machine part.
Figure 16:
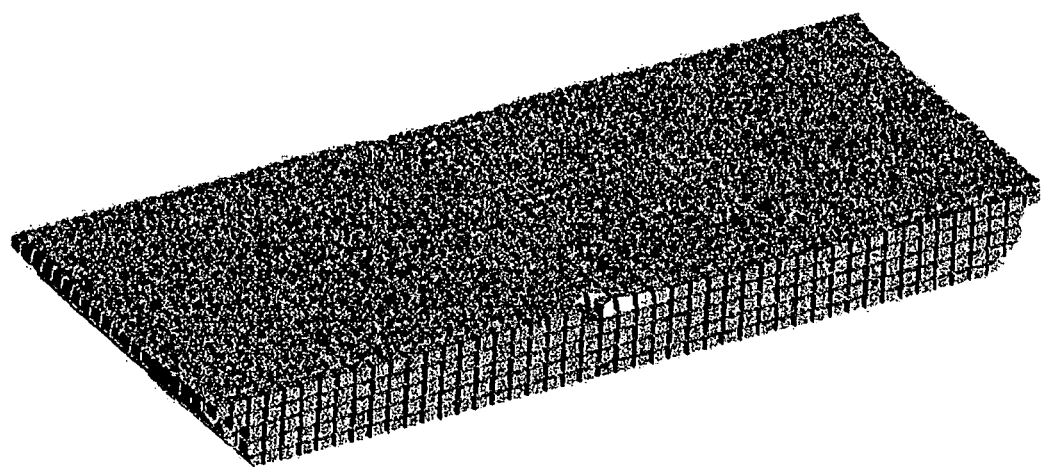
FIG. 16 is a diagram illustrating the result of simulating a material shape regarding the example of the machine part in FIG. 15.
Figure 18:
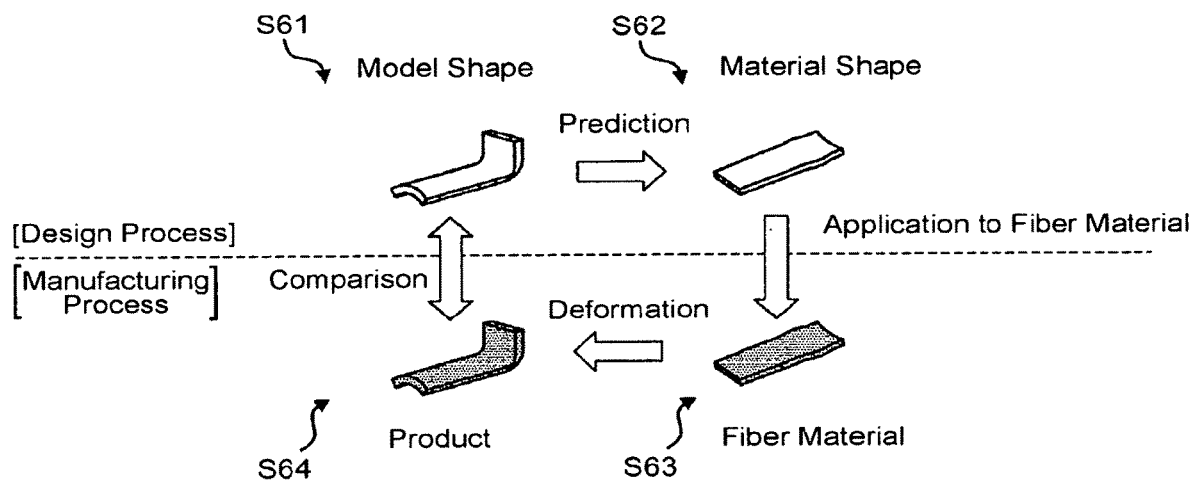
FIG. 18 is a diagram illustrating an example of a fiber-reinforced composite material manufacturing process.

FIG. 15 and FIG. 16 are diagrams illustrating simulation results of deformation of the shape of a machine part by using the material shape simulation apparatus according to this embodiment. FIG. 15 shows a model shape and FIG. 16 shows a material shape; and as illustrated in these drawings, it can be seen that the orientation of fibers designated in the model shape simulates that of the material shape in consideration of thickness. FIG. 17 is a chart indicating angular errors of the Z-yarn between actual objects and the simulation results due to differences in the weighting parameters. According to this chart, the third example has the minimum error. It is preferable as indicated in this chart that the weighting parameter $w_Z$ should be defined as equal to or less than one hundredth (1/100) of the weighting parameter $w_X$ or $w_Y$, or more preferably equal to or less than two one-hundredths (2/200) of the weighting parameter $w_X$ or $w_Y$. Furthermore, it is preferable that the weighting parameter $w_{vol}$ should be equal to or less than one-fifth (1/5) of the weighting parameter $w_X$ or $w_Y$, or more preferably equal to or less than one tenth (1/10) of the weighting parameter $w_X$ or $w_Y$. The simulation can be performed more accurately also in a quantitative sense by determining the weighting parameters as described above.

(6) Effects of this Embodiment

The material shape simulation apparatus 100 according to this embodiment includes: the orientation vector field generation unit 210 that generates a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding them with Z-yarn extending in a Z-direction; the parameterization unit 220 that searches for a gradient vector for calculating a material shape orientation vector field, which is an orientation vector field of a material shape before deformation of the model shape, from the model shape orientation vector field; and the orientation vector updating unit 230 that updates the model shape orientation vector field by applying a condition of preserving a volume between the model shape orientation vector field and the material shape orientation vector field and a condition that neither the X-yarn nor the Y-yarn expands or contracts. Therefore, the material shape simulation apparatus 100 can simulate the deformation of the three-dimensional woven fiber material more accurately and calculate the material shape.

INDUSTRIAL AVAILABILITY

The present disclosure can be applied to deformation of the three-dimensional woven fiber material.

REFERENCE SIGNS LIST 100 material shape simulation apparatus
200 computation processing unit
202 volatile storage unit
203 nonvolatile storage unit
210 orientation vector field generation unit
220 parameterization unit
230 orientation vector updating unit
240 nonlinear optimization unit
400 display device
500 input device

The invention claimed is:
1. A material shape simulation apparatus comprising:
a processor configured to
generate a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding the sheets with Z-yarn extending in a Z-direction;
search for a gradient vector for calculating a material shape orientation vector field, which is an orientation vector field of a material shape before deformation of the model shape, from the model shape orientation vector field; and
update the model shape orientation vector field by applying a condition of preserving a volume between the model shape orientation vector field and the material shape orientation vector field and a condition that neither the X-yarn nor the Y-yarn expands or contracts,
wherein the processor is configured to search for the gradient vector by defining the gradient vector according to Formula (1) below with respect to a model space (x, y, z) and a material space (X, Y, Z)

Formula (1)

$$\nabla X = \begin{pmatrix} \frac{\partial X}{\partial x} \\ \frac{\partial X}{\partial y} \\ \frac{\partial X}{\partial z} \end{pmatrix}, \nabla Y = \begin{pmatrix} \frac{\partial Y}{\partial x} \\ \frac{\partial Y}{\partial y} \\ \frac{\partial Y}{\partial z} \end{pmatrix}, \nabla Z = \begin{pmatrix} \frac{\partial Z}{\partial x} \\ \frac{\partial Z}{\partial y} \\ \frac{\partial Z}{\partial z} \end{pmatrix} \quad (1)$$

and by defining fiber directions of the model space according to Formula (2) below, Formula (2)

$$(F_X^d, F_Y^d, F_Z^d) = \begin{pmatrix} \nabla X^T \\ \nabla Y^T \\ \nabla Z^T \end{pmatrix}^{-1} \quad (2)$$

wherein when the fiber directions of the material space are defined as $F_X=(1, 0, 0)$, $F_Y=(0, 1, 0)$, and $F_Z=(0, 0, 1)$, the processor is configured to update the model shape orientation vector field by applying Formula (3) below Formula (3)

$$\|F_X^d\|=1, \|F_Y^d\|=1, F_X^d \cdot (F_Y^d \times F_Z^d)=1 \quad (3).$$

2. The material shape simulation apparatus according to claim 1,
wherein the processor is configured to set a fiber direction vector at a boundary of the model shape, propagate the fiber direction vector to a curved surface of the model shape on the basis of on the fiber direction vector at the boundary, and propagate the fiber direction vector towards inside of the model shape on the basis of the fiber direction vector of the curved surface.

3. The material shape simulation apparatus according to claim 1, wherein when the gradient vector for an orientation vector $E_{ij}=(p_i, p_j)$ at an edge of the three-dimensional meshes is defined as $((\nabla X)_{Eij}, (\nabla Y)_{Eij}, (\nabla Z)_{Eij})$, the processor is configured to search for the gradient vector so that values of right and left sides of Formula (4) below become as close to each other as possible Formula (4)

$$X(p_i)-X(p_j)=(\nabla X)_{E_{ij}} \cdot (p_i-p_j)$$

$$Y(p_i)-Y(p_j)=(\nabla Y)_{E_{ij}} \cdot (p_i-p_j)$$

$$Z(p_i)-Z(p_j)=(\nabla Z)_{E_{ij}} \cdot (p_i-p_j) \quad (4).$$

4. The material shape simulation apparatus according to claim 3,
wherein the gradient vector is searched for by minimizing each value calculated according to Formula (5) below.

Formula (5)

$$F_X = \sum_{E_{ij}} \{X(p_i) - X(p_j) - (\nabla X)_{E_{ij}} \cdot (p_i - p_j)\}^2 \quad (5)$$

$$F_Y = \sum_{E_{ij}} \{Y(p_i) - Y(p_j) - (\nabla Y)_{E_{ij}} \cdot (p_i - p_j)\}^2$$

$$F_Z = \sum_{E_{ij}} \{Z(p_i) - Z(p_j) - (\nabla Z)_{E_{ij}} \cdot (p_i - p_j)\}^2.$$

5. The material shape simulation apparatus according to claim 1,
wherein each of the three-dimensional meshes is a tetrahedron.

6. A material shape simulation apparatus comprising:
a processor configured to
generate a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding the sheets with Z-yarn extending in a Z-direction;
search for a gradient vector for calculating a material shape orientation vector field, which is an orientation vector field of a material shape before deformation of the model shape, from the model shape orientation vector field; and
update the model shape orientation vector field by applying a condition of preserving a volume between the model shape orientation vector field and the material shape orientation vector field and a condition that neither the X-yarn nor the Y-yarn expands or contracts, and update the model shape orientation vector field by minimizing strain energy of the model shape,
wherein when $E_X$, $E_Y$, and $E_Z$ are strain energy of X, Y, and Z, respectively, $E_{vol}$ is volume strain energy, and $w_X$, $w_Y$, and $w_Z$ are weighting values, the processor is configured to update the model shape orientation vector field by minimizing a value of Formula (1) below Formula (1)

$$E=w_X E_X+w_Y E_Y+w_Z E_Z+w_{vol} E_{vol} \quad (1).$$

7. The material shape simulation apparatus according to claim 6, wherein a weighting parameter $w_{vol}$ is equal to or less than one hundredth (1/100) of a weighting parameter $w_X$ or $w_Y$.

8. The material shape simulation apparatus according to claim 6, wherein a weighting parameter $w_{vol}$ is equal to or less than one-fifth (1/5) of the weighting parameter $w_X$ or $w_Y$.

9. A material shape simulation method comprising:
generating a model shape orientation vector field on three-dimensional meshes of a model shape of a three-dimensional woven fiber material which is obtained by stacking a plurality of sheets of two-dimensional woven fabric made of X-yarn extending in an X-direction and Y-yarn extending in a Y-direction and binding them with Z-yarn extending in a Z-direction;
searching for a gradient vector for calculating a material shape orientation vector field, which is an orientation vector field of a material shape before deformation of the model shape, from the model shape orientation vector field; and
updating the model shape orientation vector field by applying a condition of preserving a volume between the model shape orientation vector field and the material shape orientation vector field and a condition that neither the X-yarn nor the Y-yarn expands or contracts,
wherein the searching for the gradient vector includes defining the gradient vector according to Formula (1) below with respect to a model space (x, y, z) and a material space (X, Y, Z)

Formula (1)

$$\nabla X = \begin{pmatrix} \frac{\partial X}{\partial x} \\ \frac{\partial X}{\partial y} \\ \frac{\partial X}{\partial z} \end{pmatrix}, \nabla Y = \begin{pmatrix} \frac{\partial Y}{\partial x} \\ \frac{\partial Y}{\partial y} \\ \frac{\partial Y}{\partial z} \end{pmatrix}, \nabla Z = \begin{pmatrix} \frac{\partial Z}{\partial x} \\ \frac{\partial Z}{\partial y} \\ \frac{\partial Z}{\partial z} \end{pmatrix} \quad (1)$$

and defining fiber directions of the model space according to Formula (2) below, Formula (2)

Formula (2)

$$(F_X^d, F_Y^d, F_Z^d) = \begin{pmatrix} \nabla X^T \\ \nabla Y^T \\ \nabla Z^T \end{pmatrix}^{-1} \quad (2)$$

wherein when the fiber directions of the material space are defined as $F_X=(1, 0, 0)$, $F_Y=(0, 1, 0)$, and $F_Z=(0, 0, 1)$, the updating the model shape orientation vector field includes applying Formula (3) below Formula (3)

$$\|F_X^d\|=1, \|F_Y^d\|=1, F_X^d \cdot (F_Y^d \times F_Z^d)=1 \quad (3).$$

10. A three-dimensional woven fiber component manufacturing method comprising:
calculating a material shape by the material shape simulation method stated in claim 9;
creating a three-dimensional woven fiber material of the calculated material shape; and
forming a three-dimensional woven fiber component by deforming the three dimensional woven fiber material.

* * * * *